(12) United States Patent
Woodward et al.

(10) Patent No.: US 9,054,752 B2
(45) Date of Patent: Jun. 9, 2015

(54) HIGH RATE RF LINK TECHNOLOGY UTILIZING NEAR-MAXIMUM LIKELIHOOD MIMO SIGNAL PROCESSING

(75) Inventors: Ted K. Woodward, Holmdel, NJ (US);
John C. Koshy, Jackson, NJ (US);
Joseph Liberti, Howell, NJ (US);
Thomas Banwell, Howell, NJ (US)

(73) Assignee: Vencore Labs, Inc., Basking Ridge, NJ (US)

(*) Notice: Subject to any disclaimer, the term of this patent is extended or adjusted under 35 U.S.C. 154(b) by 514 days.

(21) Appl. No.: 13/285,571

(22) Filed: Oct. 31, 2011

(65) Prior Publication Data

US 2012/0134307 A1    May 31, 2012

Related U.S. Application Data

(60) Provisional application No. 61/416,108, filed on Nov. 22, 2010.

(51) Int. Cl.
*H04W 76/00* (2009.01)
*H04B 7/04* (2006.01)
*H04L 12/00* (2006.01)

(52) U.S. Cl.
CPC .................................... *H04B 7/0413* (2013.01)

(58) Field of Classification Search
CPC ........... H04B 7/18582; H04B 7/18508; H04B 7/18584; H04B 17/0085; H04W 24/00; H04W 24/08; H04W 16/18; H01Q 3/267
USPC ......................................... 370/252, 329, 430
See application file for complete search history.

(56) References Cited

U.S. PATENT DOCUMENTS

| | | | |
|---|---|---|---|
| 2002/0097690 A1* | 7/2002 | Fleeter et al. | 370/316 |
| 2002/0155818 A1* | 10/2002 | Boros et al. | 455/67.4 |
| 2004/0208602 A1* | 10/2004 | Plante | 398/140 |
| 2007/0025421 A1* | 2/2007 | Shattil | 375/136 |
| 2007/0223310 A1* | 9/2007 | Tran | 367/77 |
| 2008/0292016 A1* | 11/2008 | Piechocki et al. | 375/260 |
| 2012/0014483 A1* | 1/2012 | Shabany et al. | 375/341 |

OTHER PUBLICATIONS

Spectrum Exploitation of Millimetre Wave and Free Space Optical Fixed Link Services in a Rural Enviornment, Final Report, Radio Communications Research Unit, Space Science and Technology Department, CCLRC-Rutherford Appleton Laboratory, Chilton, DIDCOT, OX11 0QX, Mar. 2007.

(Continued)

*Primary Examiner* — John Pezzlo
(74) *Attorney, Agent, or Firm* — Heslin Rothenberg Farley & Mesiti P.C.

(57) ABSTRACT

A high rate radio frequency (RF) link system and method for spatially multiplexing data transmission is presented. The system can comprise a common communications point characterized by a first collection of antennas having independent channels interconnected with a known latency connection to a central process location, such as with optical fiber; and a second similarly configured collective endpoint or set of endpoints wherein multi-path between the first collection and the second collection is negligible. Signal decorrelation between independent channels is achieved through a combination of spatial separation and signal processing. In one aspect, decorrelation is performed using near-maximum likelihood Multiple-Input Multiple-Output signal processing.

12 Claims, 4 Drawing Sheets

(56) References Cited

OTHER PUBLICATIONS

J. Mietzner, et. al. "Multiple-Antenna Techniques for Wireless Communications-A Comprehensive Literature Survey," IEEE Communications Surveys & Tutorials, V. 11(2), pp. 87-105, 2009.

E. Torkildson, C. Sheldon, U. Madhow, M. Rodwell, "Millimeter-Wave Spatial Multiplexing in an Indoor Enviornment", First International Workshop on Multi-Gigabit MM-Wave and Tera-Hz Wireless Systems (MTWS'09), Honolulu, Hawaii, Nov. 2009.

E. Torkildson, C. Sheldon, U. Madhow, M. Rodwell, "Nonuniform Array Design for Robust Millimeter-Wave MIMO Links", IEEE Global Communications Conference 2009 (globecom), Honolulu, Hawaii Nov. 2009.

C. Sheldon, E. Torkildson, M. Rodwell, and U. Madhow, "Four-Channel Spatial Multiplexing Over a Millimeter-Wave Line-of-Sight Link", MTTS International Microwave Symposium, Boston, Massachusetts, Jun. 2009.

C. Sheldon, E. Torkildson, M. Seo, C.P. Yue, M. Rodwell, U. Madhow, "Spatial Multiplexing Over a Line-of-Sight Millimeter-Wave MIMO Link: A Two-Channel Hardware Demonstration at 1.2Gbps Over 40m Range", Proc. of European Microwave Conference (EuMC), Amsterdam, The Netherlands, Oct. 2008.

C. Sheldon, E. Torkildson, M. Seo, C.P. Yue, M. Rodwell, U. Madhow, "A 60GHz Line-of-Sight 2×2 MIMO Link Operating at 1.2Gbps", IEEE Ant. and Prop. Int. Symp., San Deigo, California, Jul. 2008.

E. Torkildson, B. Ananthasubramaniam, U. Madhow and M. Rodwell, "Millimeter-wave MIMO: Wireless Links at Optical Speeds," Proc. of 44th Allerton Conference on Communication, Control and Computing, Monticello, Illinois, Sep. 2006.

* cited by examiner

HIGH RATE RF LINK TECHNOLOGY UTILIZING NEAR-MAXIMUM LIKELIHOOD MIMO SIGNAL PROCESSING

CROSS REFERENCE TO RELATED APPLICATIONS

The present invention claims the benefit of U.S. provisional patent application 61/416,108 filed Nov. 22, 2010, the entire contents and disclosure of which are incorporated herein by reference as if fully set forth herein.

FIELD OF THE INVENTION

This invention relates generally to wireless communications and in particular to high capacity wireless data delivery.

BACKGROUND OF THE INVENTION

Wireless communications have been performed using a variety of techniques. Methods have included microwave communication systems in the 1-10 GHz range, Free Space Optical (FSO) communication systems, and point-to-point millimeter wave communication systems typically operating in the 20-94 GHz range. Multiple antenna techniques, and spatial multiplexing in the 50-75 GHz regime have been performed. These techniques require fixed and rigid systems typically having carefully aligned antennas.

To date, the highest capacity wireless systems utilize optical techniques. These methods suffer from environmental degradation as well as challenging pointing and tracking problems. In general, long-term availability of optical systems is well known to be lower than for radio-frequency (RF) techniques, due to behavior in the presence of fog, clouds, rain, and obscurants such as sand, foliage, and dirt.

Depending on the application, different technologies suffer from various shortcomings. These include insufficient rate, range, or availability, and/or shortcomings in size, weight, and power, or difficulties in pointing and tracking of high gain antennas. Furthermore, links of this type are almost universally point-to-point in nature. There is a need for a fast wireless data delivery system that uses RF instead of optical, and that does not require careful alignment of high gain antennas.

SUMMARY OF THE INVENTION

The present invention uses distributed arrays of RF antennas to spatially multiplex data transmission through the use of signal processing techniques to obtain significant capacity gains relative to other methods.

In the absence of multi-path, the ability to distinguish one channel from another is provided exclusively by array geometry. Perfect channel separation is achieved when the antenna elements (of the transmit and receive array) are separated from each other by the well-known Rayleigh spacing. At Rayleigh spacing, channels are perfectly orthogonal to each other. However, arrays based on Rayleigh spacing are prohibitively large. At smaller antenna spacings, the channels are no longer orthogonal to each other, and consequently, can no longer be resolved at the receiver. In this invention, a class of signal processing approaches, referred to as near-ML (maximum likelihood) Multiple-Input Multiple-Output (MIMO) detection, is proposed for separating the signals from individual antennas even when the channels are not perfectly orthogonal. Thus, using the novel approach presented herein, MIMO benefits can be realized in the absence of multipath with arrays smaller than those that rely solely on antenna spacing to achieve orthogonalization.

A high rate radio frequency (RF) link system for spatially multiplexing data transmission is presented. The system comprises a first common communications point comprising a first collection of antennas having independent channels and a known latency connection to a central process location and a second common communications point comprising a second collection of antennas having independent channels and another known latency connection to the central process location, multi-path between the first and second communications points being negligible, wherein when signals from the first collection of antennas are received at the second collection of antennas, decorrelation of the signals is performed using near-maximum likelihood Multiple-Input Multiple-Output signal processing a plurality of antennas having independent channels, the antennas grouped into one or more group arrays, one or more panels each comprising one or more of the grouped arrays, and a signal transmitted between the panels, the signal transmitted using the independent channels.

In one aspect, at least one of the first and second collection of antennas is comprised of multiple individual panels. In one aspect, the known latency connection is one of optical fiber, coaxial connections and a defined wireless connection. In one aspect, the first and second collection of antennas have a low-grain character having a wide field of view greater than one degree.

A method for spatially multiplexing data transmission in a high rate radio frequency (RF) link system comprising a first common communications point comprising a first collection of antennas having independent channels and a known latency connection to a central process location and a second common communications point comprising a second collection of antennas having independent channels and another known latency connection to the central process location, multi-path between the first and second communications points being negligible, comprising steps of decorrelating signals using near-maximum likelihood Multiple-Input Multiple-Output signal processing when signals from the first collection of antennas are received at the second collection of antennas.

In one aspect of the inventive method, at least one of the first and second collection of antennas is comprised of multiple individual panels. In one aspect, the known latency connection is one of optical fiber, coaxial connections and a defined wireless connection. In one aspect, the first and second collection of antennas have a low-grain character having a wide field of view greater than one degree.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

A system and method for high rate RF link technology is presented.

Figure 1:
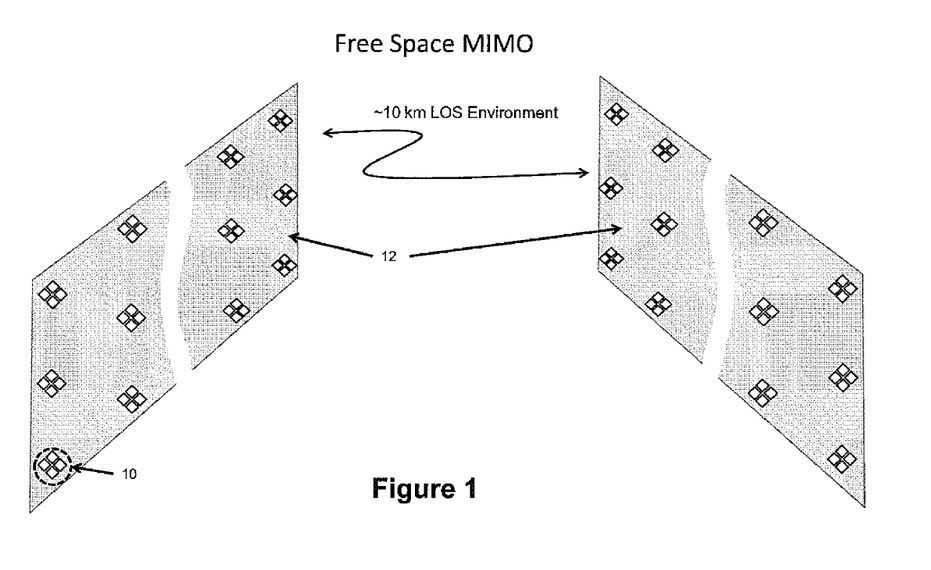
FIG. 1 illustrates free space MIMO.

FIG. 1 provides a schematic of the present invention, illustrating the overall concept of multiple apertures communicating independently to another array, with individual channels deconvolved with digital signal processing, as opposed to analog or digital beam-forming. Antennas having independent channels typically refers to antennas that can send distinguishable information to each other. FIG. 1 shows free space Multiple-Input Multiple-Output (MIMO), that is, a large number, e.g., 16-50, of independent, widely spaced apertures in an approximately ten kilometer line of sight (LOS) environment. These apertures or antennas 10 may be comprised of simple or more complex antenna structures. A four element antenna is illustrated in FIG. 1, but simple patch or more complex structures may equivalently be employed.

FIG. 1 shows a grouping of antennas 10 into monolithic arrays 12. Intuitively, the ideal case would provide linear capacity scaling with antenna count in a symmetric (Nt=Nr=N) system. Formally, this can be observed by considering the capacity equation $$C = \log_2\left(\left|I + \frac{\rho}{N_t} HH^R\right|\right),$$

where $\rho$=Signal-to-Noise Ratio (SNR), $N_t$=Number of transmit antennas, $H=N_t \times N_r$ channel matrix whose elements (i,j) define the channel from element i to j. Hence, capacity is dependent upon the SNR, the number of elements, and the channel matrix H. When each element of the capacity matrix can transmit independently to one another without interference, the matrix H is diagonalizable and grows as the square of the number of elements, thereby allowing it to be extracted from the logarithm leading to linear capacity growth with the number of elements. This stands in sharp contrast to the well-known logarithmic growth of capacity with $\rho$.

Such 'spatial multiplexing' is the capacity dimension of multiple antenna technology and provides non-logarithmic capacity scaling with N, as opposed to logarithmic capacity scaling with SNR ($\rho$). Channel independence can be obtained through diversity in transmission and reception, that is, the ability to distinguish between the signals from individual antennas. This ability to distinguish fundamentally arises from signal phase differences that can be separated from each other using signal processing techniques. Generally, these phase differences arise from multi-path interference, or the detection of multiple signal paths from a given antenna.

At frequencies wherein available bandwidth is high, typically in the millimeter wave (>30 GHz) band, RF signals have such poor propagation properties that multi-path is very limited. In the absence of multipath, signal diversity is provided exclusively by array geometry, and this capacity scaling depends on the ability to distinguish one channel from another. In other words, spatial separation is used to obtain decorrelation. Ideal decorrelation can be achieved at a given range for a specific separation of apertures (the well-known Rayleigh spacing), but this is very limiting and presents a very delicate balance of specific positions and range. Signal processing techniques, referred to as MIMO technology, can be applied to separate the signals from individual antennas, even when perfect decorrelation of signals are not available. The degree of decorrelation required in the physical arrangements depends on the capability of the algorithms employed and the computing resources available to execute them. Examples of algorithms capable of separating signals having a high degree of correlation exist and have been described elsewhere. In particular, the methods known as 'near maximum-likelihood (near-ML), such as in U.S. Pat. No. 5,593,489, incorporated herein by reference, can do this.

Many independent apertures can have separation sufficient to permit independent channels. In accordance with this configuration, several positive aspects can occur. Fundamental capacity grows faster than when using a beam-forming array, which means the use of all apertures cooperatively to send a single information stream from one point to another. A further advantage arises due to a simplification of pointing and tracking a high gain antenna that might otherwise be used. The operating frequency range can be selected based on the requirements of the application. For example, if a larger arrangement of apertures is possible, operation at lower millimeter wave carrier frequencies (e.g. 30 GHz) can be used where propagation performance is somewhat better than at higher frequencies. If smaller dimensions are needed, higher operating frequency may be more appropriate. The techniques and principles are the same. High performance digital signal processing can be leveraged as high precision mechanical tracking of high gain apertures or phased arrays are replaced by digital signal processing. This high performance digital signal processing can also be leveraged for digitally tracking channel variation and environment drift. Moreover, this configuration provides potential for higher aggregate transmit power over large areas, and for graceful degradation, reduced cost per element, and reduced vulnerability to disruption. However, some difficulties can arise with this configuration, such as antenna gain of individual apertures can be reduced, path loss effects can be significantly increased, and/or a large array will undergo mechanical shift and deformation so that digital tracking will be required (Rx). In addition, the physical size of the large array, e.g., 50 cm-2 m, limits deployment scenarios.

Figure 2:
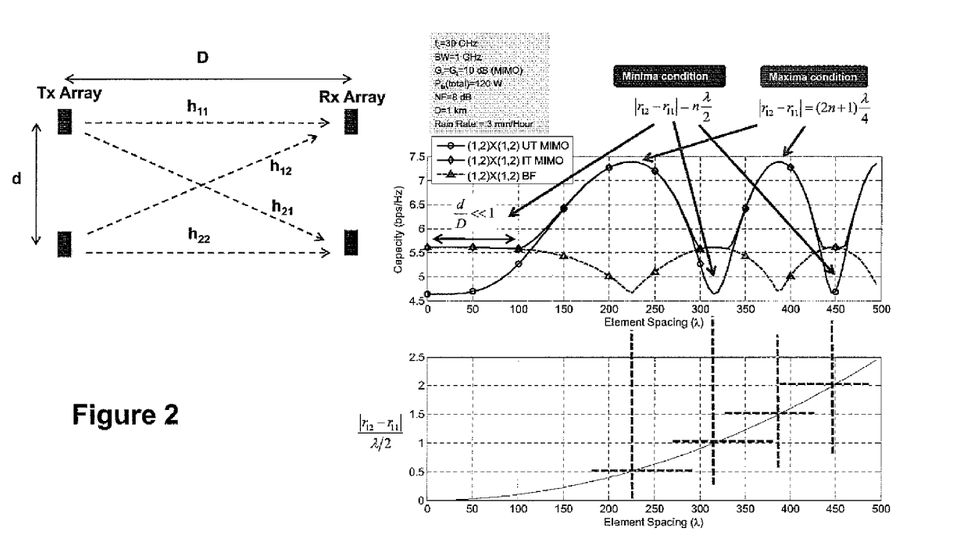
FIG. 2 illustrates simple spatial multiplexing configuration illustrating capacity gains relative to beam-forming for a two element configuration on either end of a link.

FIG. 2 illustrates the inventive concept with a simple two element arrangement. FIG. 2 shows mathematical analysis of simple 2×2 MIMO configuration illustrating capacity gains relative to beam-forming. FIG. 2 shows that maximum information capacity arises when the signal from one antenna is perfectly nulled at the other antenna. In such a case, both antennas can be used independently, approximately doubling the channel capacity relative to a case in which the two antennas are used cooperatively.

As shown in FIG. 2, the MINIMA Condition is achieved when the channel matrix H is singular, i.e., determinant (H)=0. This occurs when the path difference between two channels is an integer multiple of half-wavelength. The capacity MAXIMA condition, on the other hand, occurs when the paths are in quadrature phase. In this simple case, there are two antennas pointing at two other antennas. Capacity is shown as a function of element spacing. If there is no interference, then one can send different signals on each channel, e.g., data on $H_{11} \neq$ data on $H_{12}$. The graph on the top right of FIG. 2 shows capacity versus element spacing. The minima conditions and maxima conditions are indicated by arrows. The graph on the bottom right of FIG. 2 shows a Minima condition versus element spacing.

Figure 3:
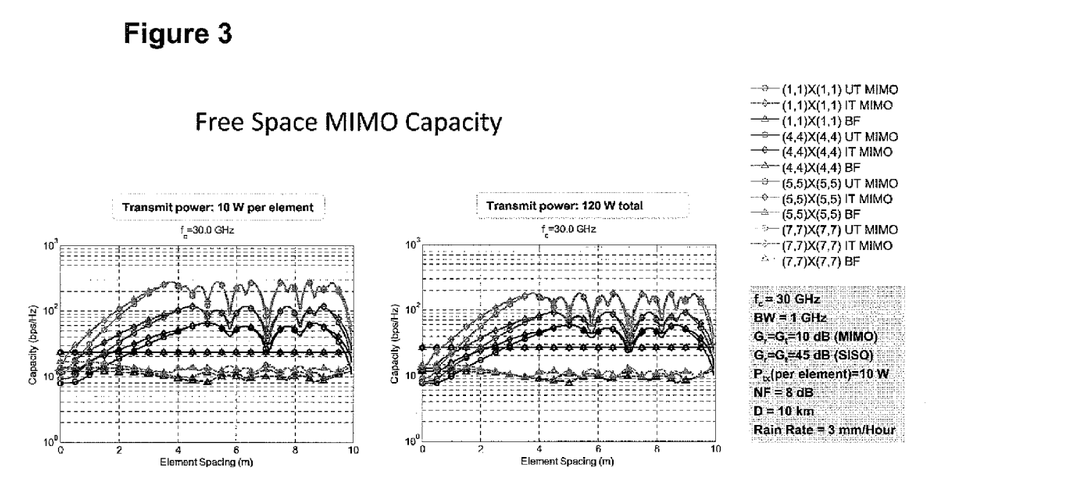
FIG. 3 illustrates capacity calculations for P×P array.

FIG. 3 shows a full information capacity computation in which the channel capacities for different array sizes (Nt, Nr) and power levels are considered. These channel capacities are also compared to a beam-forming case in which all elements cooperate to send a single information stream. Cases of an informed transmitter (IT) and an uninformed transmitter (UT) are illustrated. The former presents the optimal case, in which the transmitter adapts the power and information transmitted in each eigenmode considering its information bearing capacity, which requires advance information about the channel, usually provided in the form of a feedback channel from the receiver. In the uninformed transmitter case, the transmitter treats all available modes as equal, even though some have higher performance than others, resulting in somewhat reduced performance.

In FIG. 3, capacity calculations are shown for P×P array demonstrating high information capacity compared to a beam-forming (BF) case for different array sizes and fixed total power (FIG. 3, right) and fixed power per element (FIG. 3, left) in both informed transmitter (IT) and uninformed transmitter (UT) cases. The notation in the figure indicates the size of the transmit array and the size of the receive array as (n,m)×(p,q), respectively. Thus, the transmit array size is n×m, and that of the receive array is p×q. In these simulations n=m, and p=q, although this is not required in practice. This P×P array, which is a much larger array than the 2×2 array of FIG. 2, can contain one to forty-nine elements communicating over a ten kilometer link at a center frequency of 30 GHz. The link is impaired by rain at 3 mm/hour.

As shown in FIG. 3, the MIMO channel model assumes only free space links between elements; all spatial multiplexing is obtained through spherical wave effects resulting from the Rayleigh spacing. The capacity expression for a MIMO link is compared with the ideal beam-former, at transmission (tx) and reception (rx), using all elements. A Single-Input Single-Output (1×1 array) for a single (high gain=45 dBi) antenna with 10 W power is computed as a comparison.

Figure 4:
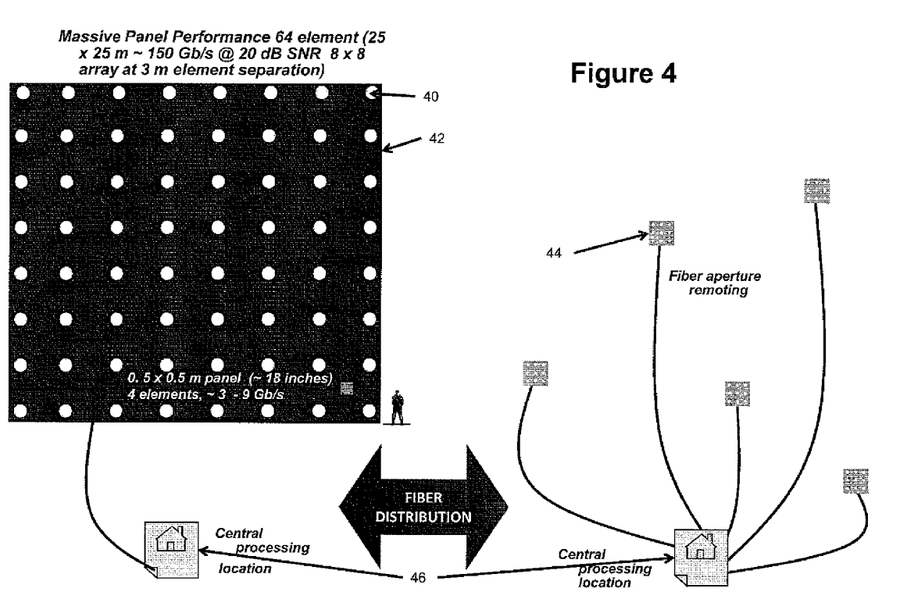
FIG. 4 illustrates the concept of Fiber distributed apertures.

In FIG. 4, the concept of separating a large array into individual sub-arrays is depicted, providing the advantage of reducing the size of the overall array. What is required in order for this to work is that the channel response between each antenna and a central processing system is known so that the central processing system may treat the overall collection of apertures as if it were a single monolithic system. In one approach, optical fiber connections can be used; however, other means can also be used, such as coaxial connections or a defined wireless connection.

FIG. 4 illustrates the concept of Fiber distributed apertures and shows a large 64 element array of antennas 40 into a large panel 42 controlled from a central control location 46. Said panel would be 25×25 meter (m) in size for an aperture separation of 3 m in an 8×8 array. Simulations of the array at a 20 dB SNR predict 150 Gb/s of information capacity over a 10 kilometers (km) range. Fiber remoting permits smaller panels 44 to be collectively utilized from a central processing location 46. Centralized access allows the same concept of operation (CONOPs) as the large array. This configuration significantly reduces visibility and increases survivability. A specific simulation compared the information capacity between a pair of single 8×8 arrays (64 elements) having a separation of 3 m over a range of 10 km to that of a fiber distributed collection of 16 sub-panels 44, each having 4 antennas at a separation of 0.5 m. The results showed that a pair of such distributed arrays could achieve 32% of the capacity between the two large arrays, and the communication between one large panel and a distributed array is 60% of the single pair. The differences arise mainly from the higher correlation of signals from the elements of the sub-arrays. Different types of sub-array 44 could be constructed depending on specific needs.

The inventive system and method comprises many distinctive features such as the following. The use of fiber-distributed arrays achieves the effect of a much larger monolithic array through a distribution of smaller, less obtrusive panels. No beam-forming behavior is required of the collection of antennas, e.g., signal processing can be used to digitally extract all the individual signals. Near-ML MIMO signal processing described previously provides the additional benefit that both antenna and panel separations may be reduced because of the ability to separate highly correlated signals. The inventive system has significantly higher capacity than a single antenna and significantly higher capacity than a single beam-forming antenna array.

Also, through the use of low-gain wider-field-of-view individual antennas, the angular field of view is significantly larger than a collection of high-gain antennas. A wider-field-of-view provides an enhanced ability to address multiple endpoints, and simplified alignment.

Moreover, the inventive system is counter-intuitive in that millimeter wave is not generally thought of as a viable MIMO technology because of the lack of multi-path, and low-gain millimeter wave apertures are not generally popular for high rate communications because of high link loss. In addition, fiber-distributed antenna arrays are novel concepts since phased array antennas cannot make productive use of them; instead, a dense collection of apertures is generally required for effective beam steering. Moreover, the computational complexity to achieve this solution can be considerable, and the resources to deliver high performance were not available until recently. In particular, recent advances in high performance graphics-oriented processors have made necessary compute capabilities more widely available than in the recent past.

The inventive system provides a smaller size solution than a monolithic array because of the fiber remoted configuration. The novel solution provides easier alignment and acquisition through use of lower-gain individual elements, eliminating pointing and tracking problems of high gain systems. In addition, problems with respect to pointing and tracking of high gain antennas are transformed into silicon processing challenges of deconvolving the previously described correlated signals from overlapping antenna patterns. This tradeoff has better prospects for future improvement because silicon processing power increases exponentially with time, while mechanical antenna tracking improvements are not nearly so rapid.

Also, in the inventive system, greater capacity than an equivalent single antenna system, as well as greater capacity than a single beam-forming phased array at the same distance, is obtained. By distributing radiated power over a greater number of antennas, the inventive system also reduces problems associated with high RF power levels at single antennas.

Further, the novel solution enables a better tradeoff between rate, range, and resolution than previous systems by adding the degree of spatial parallelism. By distributing the elements of the collection of antennas array over separate sub-panels that are connected with a low-loss, fixed-latency medium, e.g. optical fiber, the visibility and vulnerability of a single large panel is reduced by breaking it up into a series of smaller panels.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A high rate radio frequency (RF) link system for spatially multiplexing data transmission, comprising:
a first common communications point comprising a first collection of RF antennas having independent channels and a known latency connection to a central process location; and;
a second common communications point comprising a second collection of RF antennas having independent channels and another known latency connection to the central process location, multipath between the first and second communications points being negligible, wherein when signals from the first collection of RF antennas are received at the second collection of RF antennas, decorrelation of the signals performed using near—maximum likelihood Multiple-Input Multiple-Output signal processing without utilizing the multipath between the first and second communication points.

2. The RF link system according to claim 1, wherein at least one of the first and second collection of RF antennas is comprised of multiple individual panels.

3. The RF link system according to claim 2, wherein the known latency connection is one of optical fiber, coaxial connections and a defined wireless connection.

4. The RF link system according to claim 1, wherein the first and second collection of RF antennas have a low-grain character having a wide field of view greater than one degree.

5. A method for spatially multiplexing data transmission in a high rate radio frequency (RF) link system comprising a first common communications point comprising a first collection of RF antennas having independent channels and a known latency connection to a central process location and a second common communications point comprising a second collection of RF antennas having independent channels and another known latency connection to the central process location, multi-path between the first and second communications points being negligible, comprising steps of:
decorrelating signals using near-maximum likelihood Multiple-Input Multiple-Output signal processing when signals from the first collection of RF antennas are received at the second collection of RF antennas without utilizing the multipath between the first and second communication points.

6. The method according to claim 5, wherein at least one of the first and second collection of RF antennas is comprised of multiple individual panels.

7. The method according to claim 5, wherein the known latency connection is one of optical fiber, coaxial connections and a defined wireless connection.

8. The method according to claim 5, wherein the first and second collection of RF antennas have low-grain character having a wide field of view greater than one degree.

9. A computer readable storage medium storing a program of instructions executable by a machine to perform a method for spatially multiplexing data transmission in a high rate ration frequency (RF) link system comprising a first common communications point comprising a first collection of RF antennas having independent channels and a known latency connection to a central process location and a second common communication point comprising a second collection of RF antennas having independent channels and another known latency connection to the central process location, multi-path between the first and second communications point being negligible, comprising:
decorrelating signals using near-maximum likelihood Multiple-Input Multiple-Output signal processing when signals from the first collection of RF antennas are received at the second collection of RF antennas without utilizing the multipath between the first and second communication points.

10. The computer readable storage medium according to claim 9, wherein at least one of the first and second collection of RF antennas is comprised of multiple individual panels.

11. The computer readable storage medium RF link system according to claim 10, wherein the latency connection is one of optical fiber, coaxial connections and a defined wireless connection.

12. The computer readable storage medium according to claim 9, wherein the first and second collection of RF antennas have a low-grain character having a wide field of view greater than one degree.

* * * * *